United States Patent
Sakugawa (10) Patent No.: US 7,519,464 B2
(45) Date of Patent: Apr. 14, 2009

(54) RUNNING STABILITY CONTROL DEVICE FOR VEHICLE FOR TURN RUNNING ALONG CURVED ROAD

(75) Inventor: Jun Sakugawa, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 810 days.

(21) Appl. No.: 11/067,663

(22) Filed: Feb. 28, 2005

(65) Prior Publication Data

US 2005/0216161 A1 Sep. 29, 2005

(30) Foreign Application Priority Data

Mar. 26, 2004 (JP) ............... 2004-091509

(51) Int. Cl.
*G06F 7/70* (2006.01)

(52) U.S. Cl. ............... 701/70; 701/1; 701/41; 701/72; 180/197

(58) Field of Classification Search ........... 701/1, 701/41, 70, 72, 75, 79; 180/197; 303/140
See application file for complete search history.

(56) References Cited

U.S. PATENT DOCUMENTS 6,442,469 B1 * 8/2002 Matsuno ............... 701/70

FOREIGN PATENT DOCUMENTS

| DE | 102 36 734 A1 | 2/2004 |
|----|---------------|--------|
| DE | 103 28 685 A1 | 1/2005 |
| EP | 1 520 761 A2 | 4/2005 |
| JP | A 10-310042 | 11/1998 |
| JP | A 11-310146 | 11/1999 |
| JP | A 2003-159966 | 6/2003 |
| JP | A 2003-175749 | 6/2003 |
| JP | A 2004-075013 | 3/2004 |
| JP | A 2005-112007 | 4/2005 |

* cited by examiner

*Primary Examiner*—Gertrude Arthur Jeanglaud
(74) *Attorney, Agent, or Firm*—Oliff & Berridge, PLC

(57) ABSTRACT

A running stability control device for a vehicle capable of controlling a steering angle of steered vehicle wheels independently of a steering operation by a driver, and a driving/braking force applied to each vehicle wheel computes a target turn running control quantity of the vehicle, and shares the target turn running control quantity into a first part for the steering angle control and a second part for the driving/braking force control according to a sharing ratio, wherein the sharing ratio is variably changed according to a running condition of the vehicle relative to a road.

9 Claims, 5 Drawing Sheets

RUNNING STABILITY CONTROL DEVICE FOR VEHICLE FOR TURN RUNNING ALONG CURVED ROAD

BACKGROUND OF THE INVENTION

1. Field of the Invention

The present invention relates to a running stability control of a vehicle, and more particularly, to a running stability control for a vehicle according to a control of the steering angle of the steered vehicle wheels and a control of the driving/braking force applied to the vehicle wheels.

2. Description of the Prior Art

For automatically controlling a running stability of a vehicle such as an automobile, it has been proposed, as described in Japanese Patent Laid-open Publication 2003-175749 of a patent application filed by the same applicant as the present application, to construct a running stability control device of a vehicle so as to modify the steering angle of the steered vehicle wheels independently of the steering operation by a driver, and control the driving/braking force applied to the vehicle wheels, by computing a target turn running control quantity such as a target yaw moment of the vehicle, sharing the target turn running control quantity into a first target turn running control quantity by a steering angle control of the steered vehicle wheels and a second target turn running control quantity by a control of the driving/braking force applied to the vehicle wheels according to a predetermined sharing ratio therebetween, and controlling the steering angle of the steered vehicle wheels based upon the first target turn running control quantity by the steering angle control of the steered vehicle wheels and the second target turn running control quantity by the control of the driving/braking forces applied to the vehicle wheels.

When the turn running stability of the vehicle is controlled by the control of the steering angle of the steered vehicle wheels, the turn running performance of the vehicle can be controlled not to affect the driving/braking forces applied to the vehicle wheels. However, the control of the steering angle of the steered vehicle wheels is slower in its response than the control of the running stability by the driving/braking forces applied to the vehicle wheels, and is not effective to overcome an understeered condition of the vehicle. In contrast, the running stability control by the control of the driving/braking forces applied to the vehicle wheels is high in its response as compared with the running stability control by the steering control of the steered vehicle wheels, but unavoidably affects a smooth running of the vehicle by an acceleration or a deceleration being induced in the vehicle.

According to the running stability control by the above-mentioned former proposal, the target turn running control quantity is shared into the first turn running control quantity for the steering angle control of the steered vehicle wheels and the second target turn running control quantity for the driving/braking forces applied to the vehicle wheels according to a ratio predetermined based upon the responsiveness and other features of the steering device and the driving/braking force control device, so that thereby the running stability of the vehicle can be more desirably and effectively controlled as compared with the control only by the steering angle control of the steered vehicle wheels or the control only by the driving/braking force control applied to the vehicle wheels.

SUMMARY OF THE INVENTION

However, in the above-mentioned running stability control device according to the former proposal, since the target turn running control quantity is shared into the steering control and the driving/braking force control according to a predetermined ratio, it can happen that the sharing of the target turn running control quantity into the steering control and the driving/braking force control is not made at a proper ratio during turn running along a curved road, particularly according to the curving conditions of the road or the lateral position of the vehicle in the curved road.

In view of the above-mentioned problems in the running control device for variably modifying the steering angle of the steered vehicle wheels independently of the steering operation by the driver and controlling the driving/braking forces applied to the vehicle wheels, it is a primary object of the present invention to provide an improved running stability control device for a vehicle in which the sharing of the target turn running control quantity into a first target turn running control quantity for the steering angle control of the steered vehicle wheels and a second target turn running control quantity for the driving/braking force control is more desirably determined in consideration of the turn running conditions of the vehicle so that the turn running stability of the vehicle is more properly and effectively controlled.

According to the present invention, such a primary object is accomplished by a running stability control device for a vehicle having a steering device for controlling a steering angle of steered vehicle wheels independently of a steering operation by a driver, and a driving/braking force control device for controlling a driving/braking force applied to each vehicle wheel, the running stability control device comprising a computing device for computing a target turn running control quantity of the vehicle, and sharing the target turn running control quantity into a first target turn running control quantity for the steering angle control of the steered vehicle wheels and a second target turn running control quantity for the driving/braking force control according to a sharing ratio, so that the steering angle control device is controlled according to the first target turn running control quantity, while the driving/braking force control device is controlled according to the second target turn running control quantity, wherein the sharing ratio is variably changed according to a running condition of the vehicle relative to a road along which the vehicle runs.

According to such a construction, since the target turn running control quantity is shared into the first turn running control quantity for the steering control of the steered vehicle wheels and the second turn running control quantity for the control of the driving/braking force according to the sharing ratio which is variably controlled according to the running condition of the vehicle relative to the road along which the vehicle runs, the target turn running control quantity is properly shared into the first turn running control quantity for the steering control of the steered vehicle wheels and the second turn running control quantity for the driving/braking force control, so that thereby the turn running of the vehicle is properly and effectively controlled according to the running condition of the vehicle relative to the road.

The running condition of the vehicle relative to the road may be at least one of a vehicle speed relative to a radius of curvature of a curving of the road, a lateral position of the vehicle with respect to the road, and a yaw angle of the vehicle relative to the road.

According to such a construction, since the running condition of the vehicle relative to the road is at least one of the vehicle speed relative to the radius of curvature of the curving of the road, a lateral position of the vehicle with respect to the road, and a yaw angle of the vehicle relative to the road, the running condition of the vehicle relative to the road is more properly judged so that the target turn running control quantity is properly shared into the first target turn running control quantity for the steering control of the steered vehicle wheels and the second target turn running control quantity for the driving/braking force control.

The sharing ratio may be variably changed according to the radius of curvature of the curving of the road so that the sharing ratio of the second target turn running control quantity for the driving/braking force control is larger as the radius of curvature of the curving of the road is smaller.

According to such a construction, since the sharing ratio of the second target turn running control quantity for the driving/braking force control is variably controlled to be larger as the radius of curvature of the curving of the road is smaller, the turn running of the vehicle is controlled more by the driving/braking force control when the radius of curvature of the curving of the road is smaller, so that the vehicle is more definitely controlled against a severer turning condition imposed by the centrifugal force generated during the turn running due to a higher rate of curving of the road.

The sharing ratio may be variably changed according to the vehicle speed so that the second target turn running control quantity for the driving/braking force control is larger as the vehicle speed in the turn running is higher.

According to such a construction, since the sharing ratio is variably controlled according to the vehicle speed so that the second target turn running control quantity for the driving/braking force control is increased as the vehicle speed in the turn running is higher, the turn running of the vehicle is controlled more by the driving/braking force control when the vehicle speed is higher than when the vehicle speed is lower, so that the vehicle is more definitely controlled against a severer turning condition imposed by the centrifugal force applied during the turn running due to a higher vehicle speed.

In this connection, a standard vehicle speed may be determined for a certain radius of curvature of the curving of the road, so that it is judged whether the vehicle speed in the turn running is high or not according to whether the vehicle speed is larger than the standard vehicle speed or not, and when the vehicle speed is larger than the standard vehicle speed, the sharing ratio may be controlled so as to increase the second target turn running control quantity for the driving/braking force control.

According to such a construction, since the vehicle speed is compared with a standard vehicle speed determined for a certain radius of curvature of the curving of the road, and when the vehicle speed is larger than the standard vehicle speed, the sharing ratio is controlled so as to increase the second target turn running control quantity for the driving/braking force control, the sharing ratio of the second target turn running control quantity for the driving/braking force control is controlled to be properly increased by the certain radius of curvature of the curving of the road being properly selected so as to ensure a stable turn running of the vehicle along the curved road.

The sharing ratio may variably be controlled by judging an emergency index of a lateral shifting of the vehicle relative to the road toward the outside of the turn running based upon the lateral position of the vehicle relative to the road, so that the sharing ratio of the second target turn running control quantity for the driving/braking force control is increased as the emergency index is higher. In this connection, the lateral position of the vehicle relative to the road may be detected by detecting a traffic lane of the road.

According to such a construction, since a emergency index of a lateral shifting of the vehicle relative to the road toward the outside of the turn running is judged based upon the lateral position of the vehicle relative to the road, so that the sharing ratio of the second target turn running control quantity for the driving/braking force control is increased as the emergency index is higher, the vehicle is more definitely controlled against a shifting-out of the road toward the outside of the turn running by the driving/braking force control which is highly effective in suppressing the understeering condition.

In this connection, when the lateral position of the vehicle relative to the road is detected by detecting a traffic lane of the road, the lateral position of the vehicle relative to the road can be definitely detected.

The sharing ratio may be variably controlled by judging an emergency index of a lateral shifting of the vehicle relative to the road toward the outside of the turn running based upon the lateral position of the vehicle relative to the road, and detecting a yaw angle of the vehicle relative to the road, and when the emergency index is low, the sharing ratio for the first target turn running control quantity for the steering control of the steered vehicle wheels is increased when the yaw angle of the vehicle relative to the road is directed toward the inside of the curving of the road than when the yaw angle is directed toward the outside of the curving of the road.

According to such a construction, the sharing ratio of the target turn running control quantity is shared in consideration of the emergency index and the yaw angle of the vehicle so that the sharing ratio for the steering angle control is principally controlled according to the yaw angle of the vehicle relative to the road under the condition that there is a sufficient allowance for the vehicle approaching to the lateral outside edge of the road of its curving, with the vehicle running course being controlled more by the steering control when the vehicle is directed inward of the turn running than it is directed toward the outside of the turn running, whereby the yawing direction of the vehicle is desirably controlled relative to the curving direction of the road.

The computing device may further compute a target turn running condition, and compute a target yaw moment of the vehicle as the target turn running control quantity based upon a difference between the target turn running condition and an actual turn running condition corresponding thereto.

According to such construction, since a target yaw moment of the vehicle is computed based upon the difference between a target turn running condition and an actually detected turn running condition, the turn running of the vehicle is desirably controlled to follow the target turn running condition by way of the yaw moment of the vehicle being so adjusted as to cancel the difference between the target turn running condition and the actual turn running condition of the vehicle.

The device may be so constructed as to take a picture of a front view of the vehicle, and analyze the taken picture to detect the radius of curvature of the curving of the road, a lateral position of the vehicle with respect to the road, and yaw angle of the vehicle relative to the road based upon traffic lanes detected.

The device may be so constructed as to share the target turn running control quantity substantially for the driving/braking force control when no traffic lane is detected.

The device may be constructed to compute the standard vehicle speed as a root of a product of a standard lateral acceleration of the vehicle for a stable turn running thereof and the radius of curvature of the curving of the road.

The device may be so constructed as to share the target turn running control quantity substantially for the driving/braking force control when the vehicle speed is higher than the standard vehicle speed.

The device may be so constructed as to share the target turn running control quantity substantially for the driving/braking force control when the emergency index is not smaller than a predetermined value.

The device may be so constructed as to share the target turn running control quantity substantially for the driving/braking force control when the target yaw moment of the vehicle is a target yaw moment for decreasing the drifting out condition of the vehicle.

The device may be so constructed as to variably control the sharing ratio of the target turn running control quantity for the driving/braking force control according to the emergency index so that the driving/braking force control is larger as the emergency index indicates a more lateral shifting of the vehicle toward the inside of the curving of the road.

BRIEF DESCRIPTION OF THE DRAWINGS

In the accompanying drawings,

FIGS. 8A-8D are plan views showing various running conditions of the vehicle relative to the road, wherein

DESCRIPTION OF THE PREFERRED EMBODIMENT

In the following the present invention will be described in more detail with respect to a preferred embodiment thereof.

Figure 1:
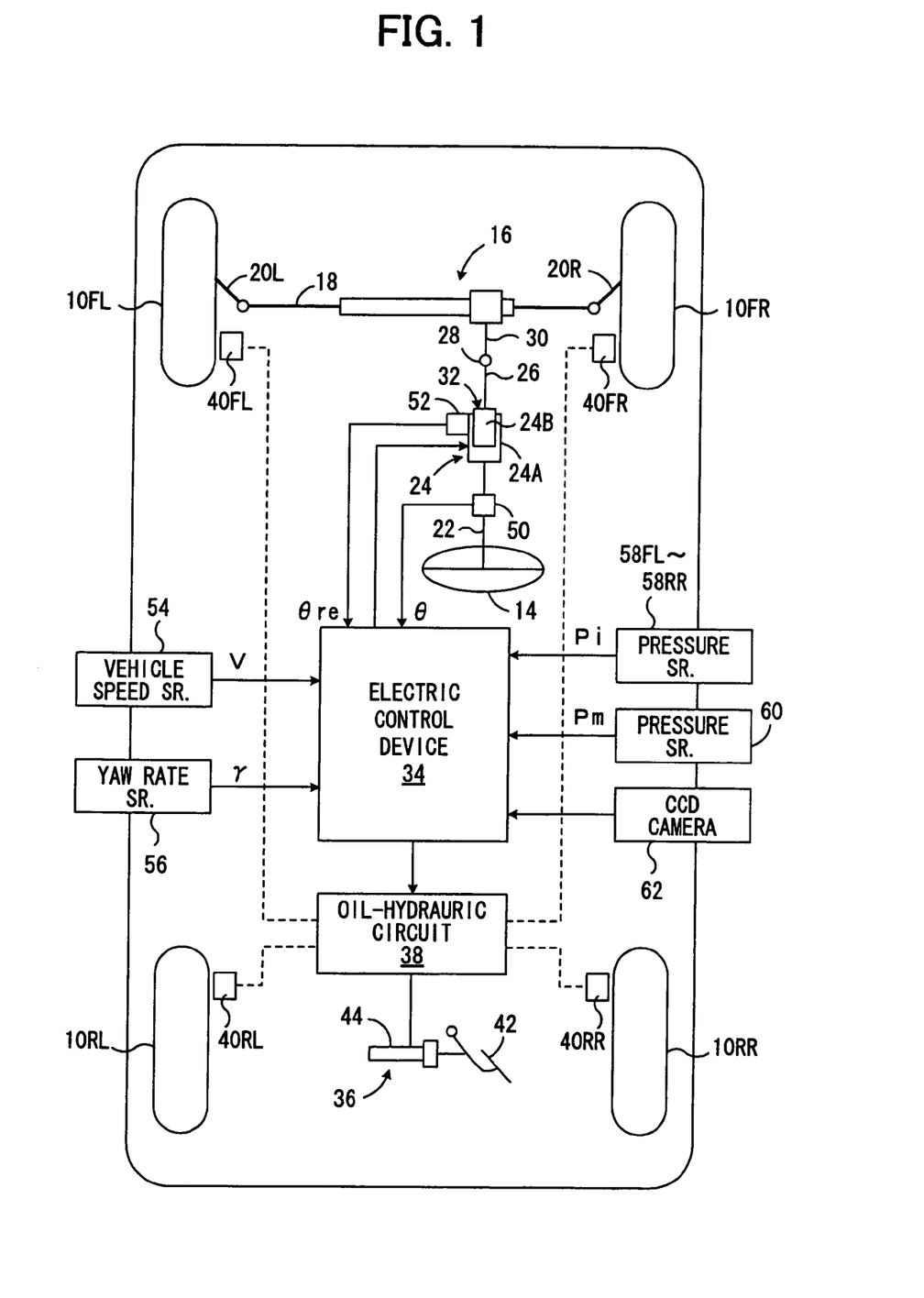
FIG. 1 is a diagrammatical view showing an embodiment of the stability control device of a vehicle according to the present invention in which the vehicle is equipped with a semi-steer-by-wire type steering angle varying device operable as an automatic steering device.

Referring to FIG. 1 showing the running stability control device for the vehicle according to the present invention in the form of an embodiment thereof by a schematic illustration, wherein the invention is applied to a vehicle equipped with a steering angle modification device functioning as an automatic steering device, 10FL and 10FR are front left and front right vehicle wheels serving as the steered vehicle wheels of a vehicle 12, and 10RL and 10RR are rear left and rear right vehicle wheels thereof. The steered front left and front right vehicle wheels 10FL and 10FR are steered in response to the steering operation of a steering wheel 14 by a driver via a rack-and-pinion type power steering device 16, a rack bar 18 and tie rods 20L and 20R.

The steering wheel 14 is drivingly connected with a pinion shaft 30 of the power steering device 16 via an upper steering shaft 22, a steering angle varying device 24, a lower steering shaft 26, and a universal joint 28. In the shown embodiment, the steering angle varying device 24 includes an auxiliary steering drive motor 32 connected with a lower end of the upper steering shaft 22 on the side of a housing 24A and with an upper end of the lower steering shaft 26 on the side of a rotor 24B.

Thus, the steering angle varying device 24 operates not only as a steering gear ratio varying device which changes the ratio of the steering angle of the steered front left and front right vehicle wheels 10FL and 10FR relative to the rotational angle of the steering wheel 14 by rotationally driving the lower steering shaft 24 relative to the upper steering shaft 22, bur also as an automatic steering device for automatically steering the front left and front right vehicle wheels 10FL and 10FR for the purpose of an automatic stability control made by an electric control device 34.

The steering angle varying device 24 drives the lower steering shaft 26 to rotate relative to the upper steering shaft 22 by the electric motor 32 so that a steering gear ratio is normally controlled to be such that a predetermined steering performance is obtained, while when it is operated for the stability control, it automatically modifies the steering angle of the front left and front right vehicle wheels 10FL and 10FR by a rotation of the electric motor 32 so that the steering rotation of the lower steering shaft 26 is changed relative to that of the upper steering shaft 22.

When a failure has occurred in the steering angle varying device 24 such that the lower steering shaft 26 can not be rotated relative to the upper steering shaft 22, a locking device not shown in FIG. 1 is operated, whereby the relative rotation between the housing 24A and the rotor 24B is mechanically locked so that the lower steering shaft 26 is no longer rotated relative to the upper steering shaft 22.

The power steering device 16 may be of any conventional type such as an oil hydraulic power steering device or an electric type power steering device. However, it is more desirable that the power steering device 16 is an electric power steering device having a ball-screw movement conversion mechanism for converting a rotation of an electric motor to a linear movement of a rack bar 18, so that a reaction torque transmitted from the steered front vehicle wheels to the steering wheel 14 is decreased.

The braking forces of the respective vehicle wheels are controlled by a control of the pressures Pi (i=fl, fr, rl and rr) in wheel cylinders 40FL, 40FR, 40RL and 40RR through an oil-hydraulic circuit 38. Although not shown in the figure, the oil-hydraulic circuit 38 includes an oil reservoir, an oil pump and other various valves, etc., wherein the pressures in the respective wheel cylinders are normally controlled by a master cylinder 44 compressed according to a depression of a brake pedal 42 by the driver, but they are also controlled separately by the electric control device 34 as required as described in detail hereinunder.

According to the shown embodiment, a steering angle sensor 50 is mounted to the upper steering shaft 22 for detecting the rotational angle of the upper steering shaft as a steering angle θ, and further, a rotational angle sensor 52 is provided between the housing 24A and the rotor 24B of the steering angle varying device 24 for detecting a relative rotational angle θre between the upper steering shaft 22 and the lower steering shaft 26. The outputs of these sensors are supplied to the electric control device 24. The rotational angle sensor 52 may be replaced by a sensor for detecting the rotational angle θs of the lower steering shaft 26, so that the relative rotational angle θre is obtained as a difference θs−θ.

The electric control device 34 is further supplied with a signal indicating vehicle speed V detected by a vehicle speed sensor 54, a signal indicating yaw rate γ of the vehicle detected by a yaw rate sensor 56, a signal indicating the braking pressures Pi of the respective vehicle wheels detected by pressure sensors 58FL-58RR, a signal indicating master cylinder pressure Pm detected by a pressure sensor 60, and a signal indicating image information of a front view of the vehicle taken by a CCD camera 62.

Although not shown in detail in FIG. 1, the electric control device 34 has a steering control portion for controlling the steering angle varying device 24, a braking force control portion for controlling the braking forces of the respective vehicle wheels, and a stability control portion for controlling the stability of the vehicle, the respective control portions being provided by a micro computer incorporating CPU, ROM, RAM, input/output ports and bilateral common bus interconnecting these elements. The steering angle sensor 50, the rotational angle sensor 52 and the yaw rate sensor 56 detect steering angle θ, relative rotational angle θre and yaw rate γ to be positive when the vehicle is steered to turn leftward.

The electric control device 34 computes an actual steering angle δa of the front left and front right vehicle wheels based upon the steering angle θ indicating the steering operation by the driver, the relative rotational angle θre and the steering gear ratio Rg, and computes a target yaw rate γt of the vehicle based upon the actual steering angle δa and the vehicle speed V. Further, the electric control device 34 computes a difference Δγ between the target yaw rate γt and the actual yaw rate γ detected by the yaw rate sensor 56, and then computes a target yaw moment Mt for decreasing the magnitude of the yaw rate difference Δγ based thereupon.

Figure 6:
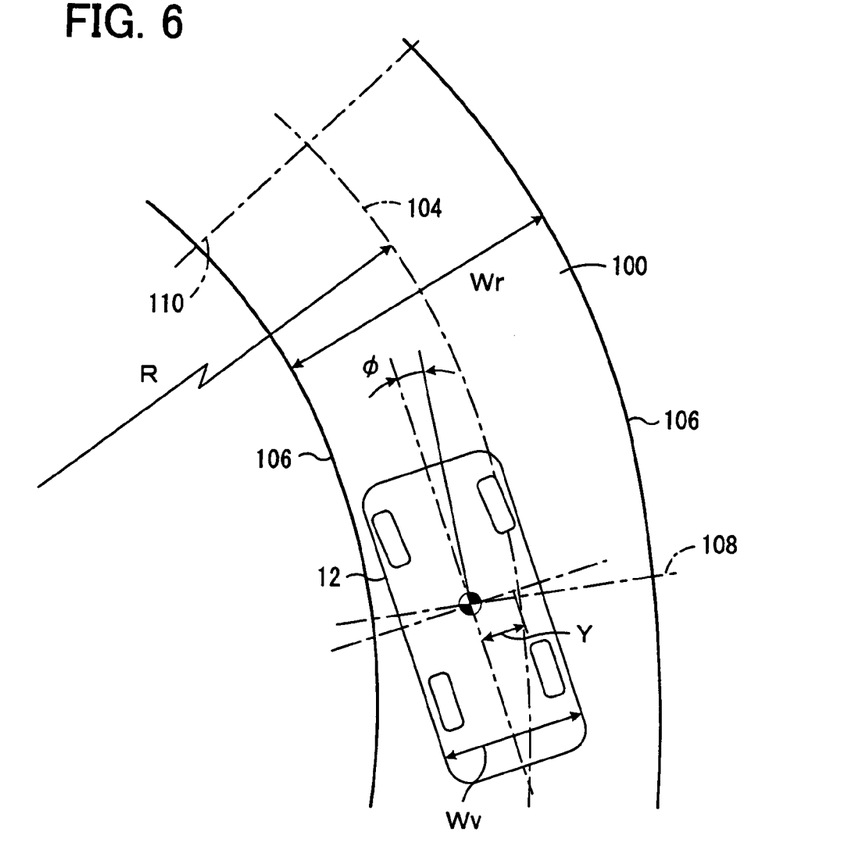
FIG. 6 is a plan view showing a turn running condition of the vehicle along a curved road.

Further, the electric control device 34 computes the radius of curvature R of the curving of a road 100, such as shown in FIG. 6, indicating the degree of curving thereof, then computes a lateral shifting Y of the vehicle relative to a center line 104 when provided by a traffic lane, and then computes a yaw angle φ of the vehicle 12 relative to the center line 104. Then the electric control device 34 computes the sharing ratio ωs of the target yaw moment Mt for the steering angle control and the sharing ratio ωb of the target yaw moment Mt for the driving/braking force control based upon the radius of curvature R of the curving of the road, the lateral shifting Y and the yaw angle φ, and then shares the target yaw moment Mt into the first target yaw moment Mts (=ωs·Mt) for the steering angle control and the second target yaw moment Mtb (=ωb·Mt) for the driving/braking force control.

Further, the electric control device 34 computes a target steering angle difference Δδt for the front left and front right vehicle wheels to accomplish the target yaw moment Mts, then controls the steering angle varying device 24 so that the steering angle of the front left and front right vehicle wheels 10FL and 10FR becomes the target steering angle δt which is the sum of the actual steering angle δa and the target steering angle difference Δδt, then computes the target braking pressures Pti of the respective wheel cylinders to accomplish the target yaw moment Mtb, and then controls the braking pressures Pi of the respective wheel cylinders to become the target braking pressures Pti, so as to decrease the yaw rate difference Δγ.

Figure 2:
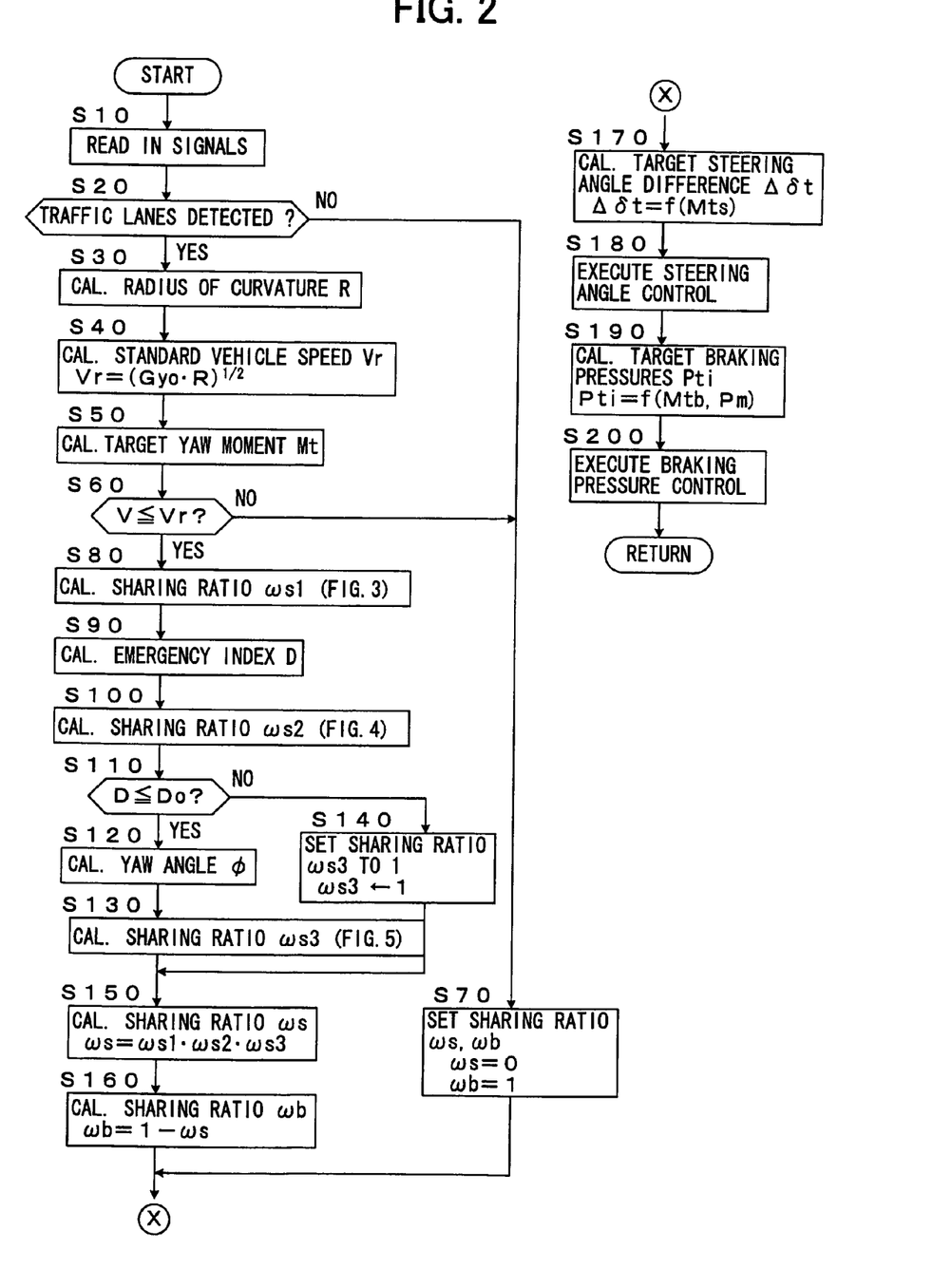
FIG. 2 is a flowchart of a steering angle control routine for the front left and front right vehicle wheels according to the embodiment shown in FIG. 1.

The stability control of the vehicle by the steering control of the front left and front right vehicle wheels executed by the electric control device 34 of the shown embodiment will be described with reference to the flowchart of FIG. 2. The control according to the flowchart of FIG. 2 is started by a closing of an ignition switch not shown in the figure and is repeatedly executed at a predetermined time interval.

First in step 10, the signals indicating the steering angle θs and others are read in. Then in step 20, an image of the front view taken by CCD camera 62 is processed by an image analysis treatment known in this art, so as to judge if traffic lanes such as a center line 104 and road side lanes 106 as shown in FIG. 6 are detected or not. When the answer is yes, the control proceeds to step 30, whereas when the answer is no, the control proceeds to step 70.

In step 30, based upon the information on the road 100 obtained by the above-mentioned image analysis treatment, the shape of the road 100 up to the position 110 at which the vehicle 12 will arrive after the lapse of a standard time Te from the present position 108 is estimated, and based upon the shape of the road 100 thus estimated, the radius of curvature R of the curving of the road is computed to show the degree of curving of the road 100 between the positions 108 and 110.

In step 40, by adopting a standard lateral acceleration of the vehicle by which the vehicle can stably make a turn running to be Gyo (positive constant), a standard vehicle speed Vr of the vehicle during the turn running is computed according to the following formula 1.

$$Vr = (Gyo \cdot R)^{1/2} \tag{1}$$

In step 50, the steering angle δf (=θ/Rg) of the front left and front right vehicle wheels is computed based upon the steering angle θ and the steering gear ratio Rg, then denoting the vehicle wheel base as H and a stability factor as Kh, a standard yaw rate γe is computed based upon the vehicle speed V and the steering angle δf according to the following formula 2, and then the target yaw rate γt of the vehicle is computed according to the following formula 3, wherein T is a time constant and s is the Laplace operator. The standard yaw rate γe may be computed by incorporating the lateral acceleration Gy of the vehicle so as to take the dynamic yaw rate into consideration.

$$\gamma e = V \cdot \delta f / (1 + Kh V^2) H \tag{2}$$

$$\gamma t = \gamma e / (1 + Ts) \tag{3}$$

Then, a yaw rate difference Δγ is computed as a difference between the target yaw rate γt and the actual yaw rate γ of the vehicle. And then the target yaw moment Mt is computed as a target turn running control quantity for decreasing the magnitude of the yaw rate difference Δγ according to the manner well known in this art.

In step 60, it is judged if the vehicle speed V is not larger than the standard vehicle speed Vr. When the answer is yes, the control proceeds to step 80, while when the answer is no, the control proceeds to step 70, wherein the sharing ratio ωs of the target yaw moment Mt for the steering angle control is set to 0, while the sharing ratio ωb of the target yaw moment for the braking force control is set to 1.

Figure 3:
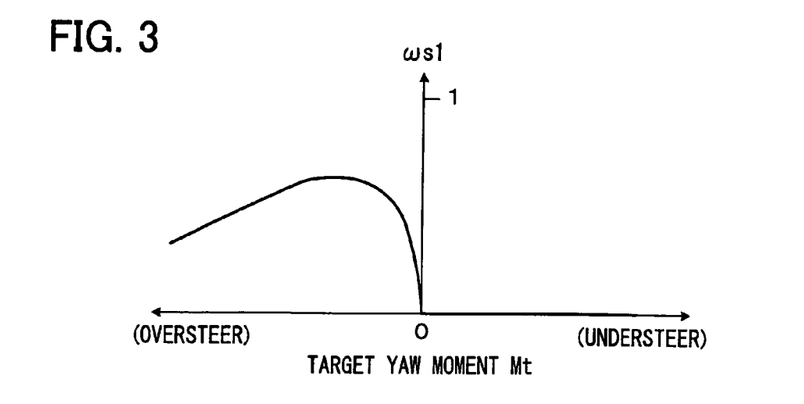
FIG. 3 is a map showing the performance of the sharing ratio ωs1 for the steering angle control based upon the target yaw moment Mt.

In step 80, the sharing ratio ωs1 for the steering angle control is computed by referring to a map such as shown in FIG. 3 based upon the target yaw moment Mt. As will be understood from FIG. 3, the sharing ratio ωs1 is set to 0 when the target yaw moment Mt is a yaw moment to suppress an understeer, and is set to be smaller as the target yaw moment Mt is larger when the target yaw moment Mt is a yaw moment to suppress an oversteer. However, in order to avoid that the target yaw moment Mt changes abruptly when the running condition changes between an understeered condition and an oversteered condition, it should be so designed that the sharing ratio ωs1 gradually increases near and across the border between the understeered condition and the oversteered condition.

In step 90, the lateral shifting Y of the vehicle relative to the center line 104 is computed (to be positive toward the outside of the turn running from the center line), and then an emergency index D of the lateral shifting of the vehicle 12 is computed based upon the lateral difference Y, the width Wr of the road and the width Wv of the vehicle 12 according to the following formula 4. The emergency index D means that when it is closer to 0, there remains a largest allowance for the lateral shifting of the vehicle relative to the road 100 toward both sides of the road, while when it is closer to 1, the vehicle is more liable to run out of the road on the outside of the turn, and when it is closer to −1, the vehicle is more liable to run out of the road on the inside of the turn running, provided that the both sides of the center line of the road is temporarily available for the vehicle.

$$D = 2Y/(Wr - Wv) \quad (4)$$

Figure 4:
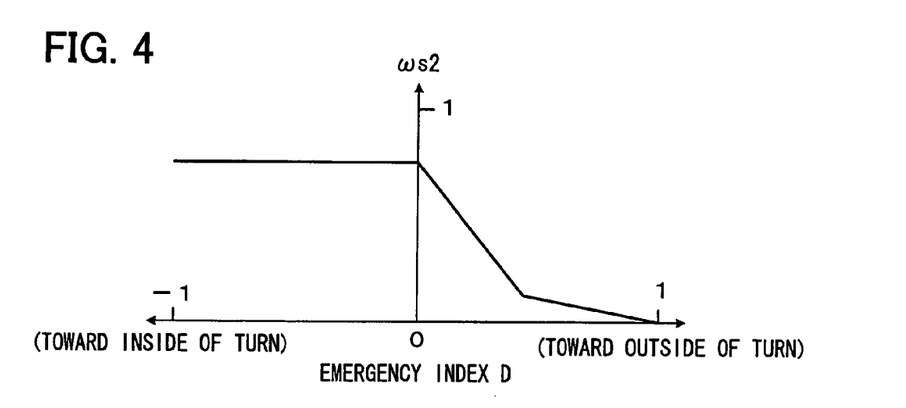
FIG. 4 is a map showing the performance of the sharing ratio ωs2 for the steering angle control based upon the emergency index D of the lateral shifting of the vehicle relative to the road.

In step 100, the sharing ratio ωs2 is computed based upon the emergency index D by referring to a map such as shown in FIG. 4. As will be understood from FIG. 4, the sharing ratio ωs2 is made smaller as the emergency index D approaches to 1 in the positive value, while it is made constant when the emergency index D is negative.

In step 110, it is judged if the emergency index D is not larger than a standard value Do (a negative constant larger than −1), that is, if the allowance for a shifting of the vehicle 12 toward the outside of the turn running is high or not. When the answer is yes, the control proceeds to step 120.

Figure 5:
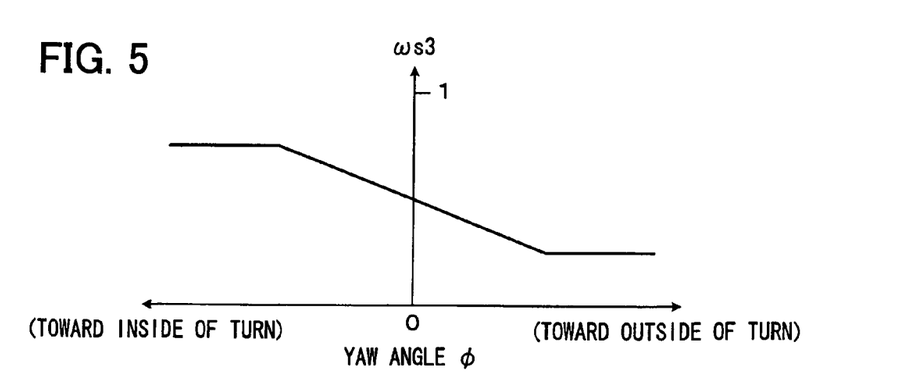
FIG. 5 is a map showing the performance of the sharing ratio ωs3 for the steering angle control based upon the yaw angle φ of the vehicle.

In step 120, the yaw angle φ of the vehicle 12 relative to the center line 104 of the road 100 is computed. Then, in step 130, the sharing ratio ωs3 based upon the yaw angle φ is computed by referring to a map such as shown in FIG. 5. As will be understood from FIG. 5, the sharing ratio ωs3 is set to become larger as the yaw angle φ becomes larger toward to the inside of the turn running.

When the answer is no, the control proceeds to step 140, wherein a sharing ratio ωs3 for the steering angle control based upon the yaw angle φ is set to 1, In step 150, the sharing ratio ωs of the target yaw moment Mt for the steering angle control is computed as a product of the sharing ratios ωs1, ωs2 and ωs3, and then in step 160, the sharing ratio ωb of the target yaw moment Mt for the braking force control is computed as 1−ωs.

In step 170, the shared quantity Mts of the target yaw moment for the steering control is computed as a product of the sharing ratio ωs and Mt, and then the target steering angle difference Δδt for the front vehicle wheels is computed as a function of the target yaw moment Mts for the steering angle control. Then in step 180, the steering angle varying device 24 is operated so that the front left and front right vehicle wheels are steered for the target steering angle difference Δδt.

In step 190, the shared target yaw moment Mtb for the braking force control is computed as a product of ωb and Mt, and then the target braking pressures Pti (i=fl, fr, rl and rr) of the respective vehicle wheels are computed as a function of Mtb and the master cylinder pressure Pm. Then in step 200, the oil hydraulic circuit 38 is operated so that the braking pressures Pi of the respective vehicle wheels are controlled to the target braking pressures Pti.

Thus, according to the shown embodiment, when the center line 104 and the side lanes 106 of the road 100 are detected so that the answer of the step 20 is yes, the radius of curvature R of the curving of the road 100 extending from the present position 108 to the position 110 at which the vehicle 12 will arrive after the standard time Te is computed in step 30, and then in step 40 the standard vehicle speed Vr for letting the vehicle make a stable turn running based upon the radius of curvature R of the curving of the road is computed, and in step 50 the target yaw moment Mt for letting the vehicle make the turn running stably is computed.

When the vehicle speed V is higher than the standard vehicle speed Vr, the answer of step 60 becomes no, and in that case the sharing ratio ωs for the steering angle control is set to 0, while the sharing ratio ωb for the braking force control is set to 1 in step 70, so that thereby all of the target yaw moment Mt is shared for the target yaw moment Mtb for the control of the braking force, so as to attain the target yaw moment Mt by the control of the braking pressures Pi of the respective vehicle wheels to the target braking forces Pti. Therefore, in this case a stable turn running of the vehicle is ensured by controlling the yaw moment M of the vehicle to the target yaw moment Mt according to the braking force control of the respective vehicle wheels, without depending upon the steering control of the front left and front right vehicle wheels by the steering angle varying device 24.

In contrast, when the vehicle speed V is not larger than the standard vehicle speed Vr, the answer of step 60 is yes, and then in steps 80-150 the computations are made so as to obtain the sharing ratio ωs1 for the steering angle control based upon the target yaw moment Mt, the sharing ratio ωs2 based upon the emergency index D with regard to the lateral shifting of the vehicle relative to the road, and the sharing ratio ωs3 based upon the yaw angle of the vehicle relative to the road, and then to share the target yaw moment Mt for the steering angle control by the product ωs of ωs1, ωs2 and ωs3, while the braking force control is executed by the sharing ratio ωb=1−ωs of the target yaw moment.

In this case, therefore, the sharing of the target yaw moment Mt into the target yaw moment Mts for the steering angle control and the target yaw moment Mtb for the braking force control is made to be optimum according to the distinction between an understeer or an oversteer condition reflected on the magnitude of the target yaw moment Mt, the emergency index D of the lateral shifting of the vehicle relative to the road, and the yaw angle φ of the vehicle, so that thereby the running of the vehicle according to the running conditions of the vehicle relative to the road is properly and effectively controlled.

Since particularly the sharing ratio ωs1 for the steering angle control based upon the target yaw moment Mt is set to 0 when the target yaw moment Mt is an understeer suppress yaw moment, it is avoided that the target yaw moment Mt is uselessly too much shared for the target yaw moment Mts for the steering angle control under the condition that the vehicle is in an understeer condition in which the lateral force of the front vehicle wheels can not be increased by the steering action, while the sharing ratio ωs1 for the steering angle control based upon the target yaw moment Mt is made gradually smaller as the target yaw moment Mt is larger in the oversteer suppress region, so as not to be an excessive steering control in such a highly oversteering condition, with a larger part of the target yaw moment Mt being now shared for the braking force control, so that the oversteering condition of the vehicle is effectively suppressed.

Further, since the sharing ratio ωs2 based upon the emergency index D of the lateral shifting of the vehicle relative to the road is computed to be smaller as the emergency index D is closer to 1 in a positive value, while it is set to a constant value when the emergency index D is negative, a more part of the target yaw moment Mt is shared for the braking control when the vehicle is more liable to run out of the road toward to the outside of the turn running, while the a less part of the target yaw moment Mt is shared for the braking force control when the vehicle is less liable to run out of the road toward to the outside of the turn running, so that a deceleration of the vehicle for the turn stability control is suppressed to be a necessary minimum, while when the vehicle is more liable to run out of the road toward the outside of the turn running, a running out of the vehicle from the road to the outside of the turn running is definitely suppressed by a larger part of the target yaw moment Mt being shared for the braking force control.

Further, since the sharing ratio ωs3 is controlled under the condition that the emergency index D of the lateral shifting of the vehicle relative to the road is less than the standard value Do so as to be based upon the yaw angle φ of the vehicle to become larger as the yaw angle φ is larger toward the inside of the turn running, the tendency of the vehicle to spin is suppressed by the steering angle control while decreasing the braking force control, while when the vehicle is in a drifting out tendency, it is more effectively suppressed by the braking force control.

Figure 8A:
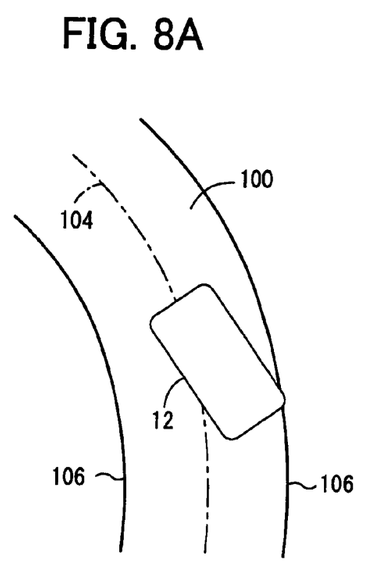
FIG. 8A shows the vehicle running toward the inside of the turn running as laterally shifted toward the outside of the turn running.
Figure 8B:
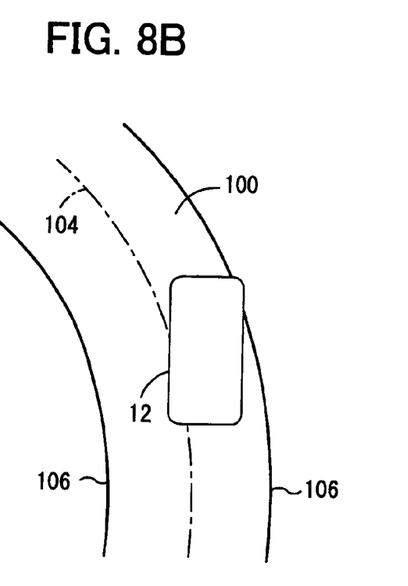
FIG. 8B shows the vehicle running toward the outside of the turn running as laterally shifted to the outside of the turn running.
Figure 8C:
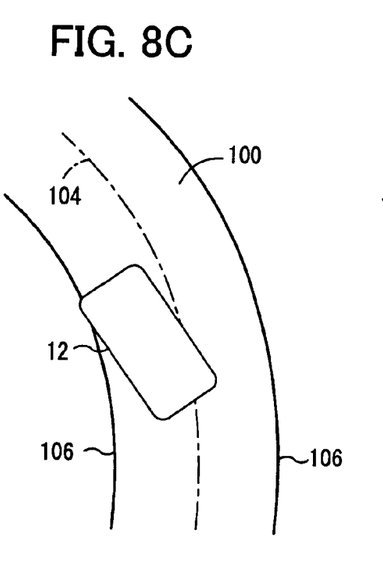
FIG. 8C shows the vehicle running toward the inside of the turn running as shifted toward the inside of the turn running.
Figure 8D:
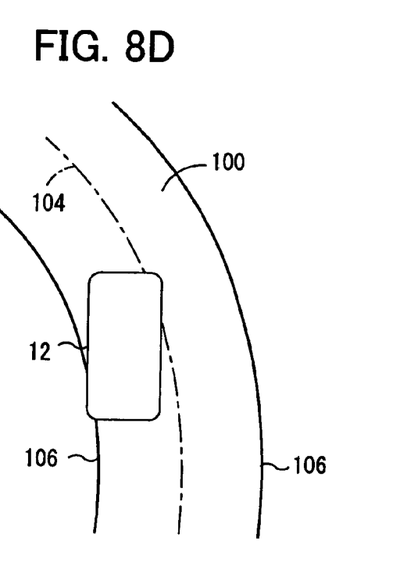
FIG. 8D shows the vehicle running toward the outside of the turn running as laterally shifted to the inside of the turn running.

FIGS. 8A-8D show four examples for a vehicle 12 making a turn running along a curved road 100, wherein FIG. 8A shows the vehicle running toward the inside of the turn running as laterally shifted toward the outside of the turn running, FIG. 8B shows the vehicle running toward the outside of the turn running as laterally shifted toward the outside of the turn running, FIG. 8C shows the vehicle running toward the inside of the turn running as laterally shifted toward the inside of the turn running, and FIG. 8D shows the vehicle running toward the outside of the turn running as laterally shifted toward the inside of the turn running. When the vehicle is running as laterally shifted toward the outside of the turn running as shown in FIGS. 8A and 8B, since the emergency index D of the lateral shifting is high regardless of the direction of the vehicle toward the inside or the outside of the turn running, the sharing ratio ωs2 is computed to be small, so that thereby the target yaw moment Mt is more shared for the target yaw moment Mtb for the braking force control, and the target yaw moment Mt is attained principally by the braking force control.

When the vehicle is running toward the inside of the turn running as laterally shifted toward to the inside of the turn running as in the case of FIG. 8C, the emergency index D is low, while the yaw angle φ is a large positive value, so that the sharing ratios ωs2 and ωs3 are both computed to be relatively large, whereby the target yaw moment Mt is principally shared for the target moment Mts for the steering angle control, and the target yaw moment Mt is principally attained by the steering angle control of the front left and front right vehicle wheels.

When the vehicle is running toward the outside of the turn as laterally shifted toward the inside of the turn as in the case of FIG. 8D, the emergency index D is low, while the yaw angle φ is large in the negative value, so that the sharing ratio ωs2 is computed to be relatively large, while the sharing ratio ωs3 is computed to be relatively small, whereby the target yaw moment Mt is principally shared for the target yaw moment Mtb for the braking force control, and the target yaw moment Mt is principally attained by the braking force control.

Although the present invention has been described in detail with respect to a particular embodiment thereof, it will be apparent for those skilled in the art that various modifications are possible within the scope of the present invention.

For example, although in the shown embodiment the steering angle varying device 24 is constructed to rotate the lower steering shaft 26 relative to the upper steering shaft 22 for automatically steering the front left and front right vehicle wheels 10FL and 10FR, such a steering angle varying device may be constructed to be of an expansion/contraction type for varying the length of the tie rods 20L and 20R or a steer-by-wire type or any other type steering mechanism known in this art. Further, when the vehicle is steered at the rear vehicle wheels, the steering angle varying device is incorporated in the rear steering system.

Further, a low pass filtering treatment may be provided after step 70 or 150 or both.

Further, although in the shown embodiment the sharing ratio ωs of the target yaw moment Mt for the steering angle control is set to 0, while the sharing ratio ωb of the target yaw moment Mt for the braking force control is set to 1 in step 70 when it was judged in step 20 that the traffic lanes are not detected, the control may be so modified that when it was judged in step 20 that the traffic lanes are not detected, the target yaw moment Mt is shared into the target yaw moment Mts for the steering angle control and the target yaw moment Mtb for the braking force control according to an appropriately moderate ratio not so extreme as 0 vs. 1.

Figure 7:
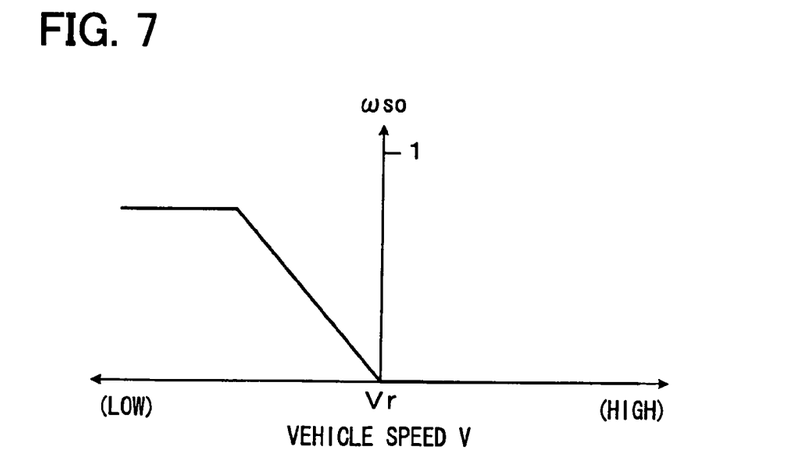
FIG. 7 is a map showing the performance of the sharing ration ωso for the steering angle control based upon the vehicle speed V.

Further, although in the shown embodiment the sharing ratio ωs of the target yaw moment for the steering angle control is set to 0, while the sharing ratio ωb of the target yaw moment Mt for the braking force control is set to 1 in step 70 when it was judged in step 60 that the vehicle speed V is not smaller than the standard vehicle speed Vr, the control may be so modified that the sharing ratio is such as ωso shown in FIG. 7 according to the vehicle speed so that the sharing ratio ωso is made smaller as the vehicle speed V is larger than the standard vehicle speed Vr, and the sharing ratio ωs of the target yaw moment Mt for the steering angle control is computed as a product of ωso, ωsi, ωs2 and ωs3.

Further, although in the shown embodiment the front left and front right vehicle wheels are steered to attain the target yaw moment Mts for the steering angle control, the control may be done such that a steering gear ratio Rg is computed for attaining a required steering performance based upon the vehicle speed V, then a temporary target steering angle δst is computed based upon the steering angle θ indicating the steering operation of the driver and the steering gear ratio Rg, so that the steering angle of the front left and front right vehicle wheels is normally controlled to become the temporary target steering angle δst, while when the steering modification control is executed, the steering angle of the front left and front right vehicle wheels is controlled to be a sum of the temporary target steering angle δst and a steering angle difference for attaining the target yaw moment Mst.

Further, although in the shown embodiment the respective vehicle wheels are controlled only of the braking forces, the respective vehicle wheels may be controlled with respect to the braking forces as well as the driving forces when the vehicle wheels are adapted to be driven by built-in motors.

The invention claimed is:

1. A running stability control device for a vehicle having a steering device for controlling a steering angle of steered vehicle wheels independently of a steering operation by a driver, and a driving/braking force control device for controlling a driving/braking force applied to each vehicle wheel, the running stability control device comprising a computing device for computing a target turn running control quantity of the vehicle, and sharing the target turn running control quantity into a first target turn running control quantity for the steering angle control of the steered vehicle wheels and a second target turn running control quantity for the driving/braking force control according to a sharing ratio, so that the steering angle control device is controlled according to the first target turn running control quantity, while the driving/braking force control device is controlled according to the second target turn running control quantity, wherein the sharing ratio is variably changed according to a running condition of the vehicle relative to a road along which the vehicle runs.

2. A running stability control device according to claim 1, wherein the running condition of the vehicle relative to the road is at least one of a vehicle speed relative to a radius of curvature of a curving of the road, a lateral position of the vehicle with respect to the road, and a yaw angle of the vehicle relative to the road.

3. A running stability control device according to claim 2, wherein the sharing ratio is variably changed according to the radius of curvature of the curving of the road so that the sharing ratio of the second target turn running control quantity for the driving/braking force control is larger as the radius of curvature of the curving of the road is smaller.

4. A running stability control device according to claim 2, wherein the sharing ratio is variably changed according to the vehicle speed so that the second target turn running control quantity for the driving/braking force control is larger as the vehicle speed in the turn running is higher.

5. A running stability control device according to claim 4, wherein the vehicle speed in the turn running is compared with a standard vehicle speed determined for a certain radius of curvature of the curving of the road, and when the vehicle speed is larger than the standard vehicle speed, the sharing ratio is controlled so as to increase the second target turn running control quantity for the driving/braking force control.

6. A running stability control device according to claim 1, wherein the computing device further compute a target turn running condition, and compute a target yaw moment of the vehicle as the target turn running control quantity based upon a difference between the target turn running condition and an actual turn running condition corresponding thereto.

7. A running stability control device for a vehicle having a steering device for controlling a steering angle of steered vehicle wheels independently of a steering operation by a driver, and a driving/braking force control device for controlling a driving/braking force applied to each vehicle wheel, the running stability control device comprising a computing device for computing a target turn running control quantity of the vehicle, and sharing the target turn running control quantity into a first target turn running control quantity for the steering angle control of the steered vehicle wheels and a second target turn running control quantity for the driving/braking force control according to a sharing ratio, so that the steering angle control device is controlled according to the first target turn running control quantity, while the driving/braking force control device is controlled according to the second target turn running control quantity,
  wherein the sharing ratio is variably changed according to a running condition of the vehicle relative to a road along which the vehicle runs,
  wherein the running condition of the vehicle relative to the road is at least one of a vehicle speed relative to a radius of curvature of a curving of the road, a lateral position of the vehicle with respect to the road, and a yaw angle of the vehicle relative to the road, and
  wherein the sharing ratio is variably controlled by judging an emergency index of a lateral shifting of the vehicle relative to the road toward the outside of the turn running based upon the lateral position of the vehicle relative to the road, so that the sharing ratio of the second target turn running control quantity for the driving/braking force control is increased as the emergency index is higher.

8. A running stability control device according to claim 7, wherein the lateral position of the vehicle relative to the road is detected by detecting a traffic lane of the road.

9. A running stability control device for a vehicle having a steering device for controlling a steering angle of steered vehicle wheels independently of a steering operation by a driver, and a driving/braking force control device for controlling a driving/braking force applied to each vehicle wheel, the running stability control device comprising a computing device for computing a target turn running control quantity of the vehicle, and sharing the target turn running control quantity into a first target turn running control quantity for the steering angle control of the steered vehicle wheels and a second target turn running control quantity for the driving/braking force control according to a sharing ratio, so that the steering angle control device is controlled according to the first target turn running control quantity, while the driving/braking force control device is controlled according to the second target turn running control quantity,
  wherein the sharing ratio is variably changed according to a running condition of the vehicle relative to a road along which the vehicle runs,
  wherein the running condition of the vehicle relative to the road is at least one of a vehicle speed relative to a radius of curvature of a curving of the road, a lateral position of the vehicle with respect to the road, and a yaw angle of the vehicle relative to the road, and
  wherein the sharing ratio is variably controlled by judging an emergency index of a lateral shifting of the vehicle relative to the road toward the outside of the turn running based upon the lateral position of the vehicle relative to the road, and detecting a yaw angle of the vehicle relative to the road, and when the emergency index is low, the sharing ratio for the first target turn running control quantity for the steering control of the steered vehicle wheels is increased when the yaw angle of the vehicle relative to the road is directed toward the inside of the curving of the road than when the yaw angle is directed toward the outside of the curving of the road.

* * * * *